Aug. 13, 1963  J. W. ROBINS  3,100,399
PNEUMATIC SERVO-POSITIONER UNIT
Filed July 21, 1961  4 Sheets-Sheet 1
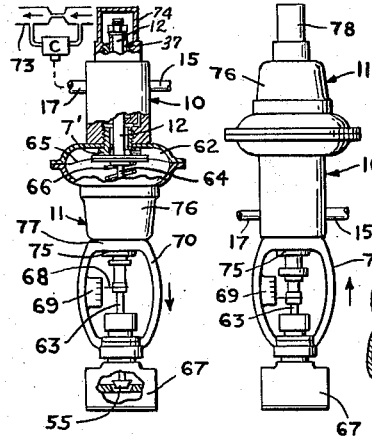
FIG. 1    FIG. 2
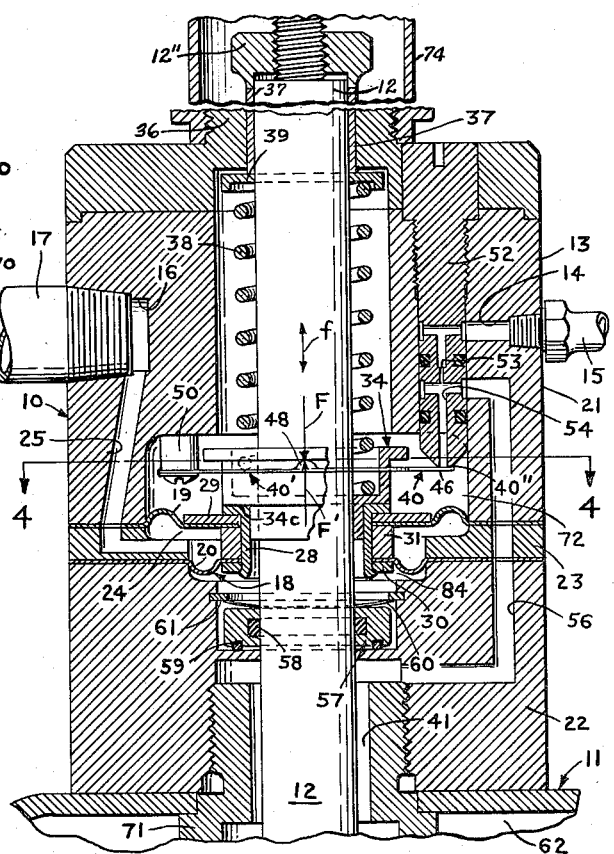
FIG. 3
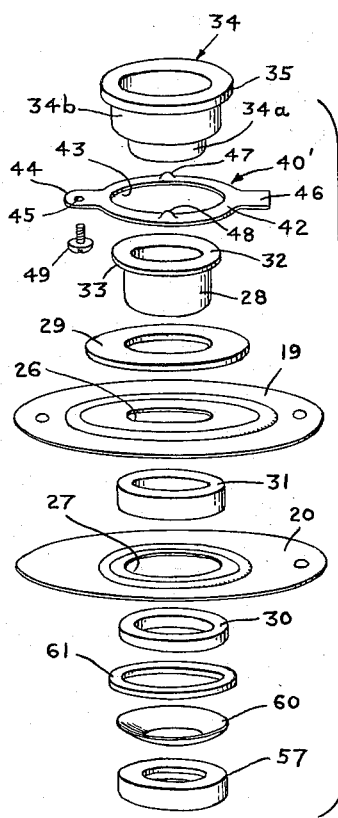
FIG. 4
FIG. 5
JOHN W. ROBINS
*INVENTOR.*
BY Daniel H. Robins
Atty.

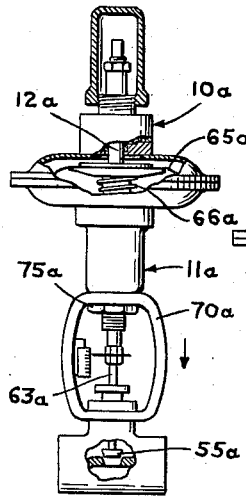
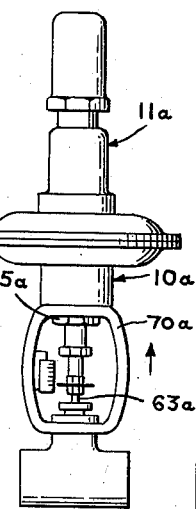
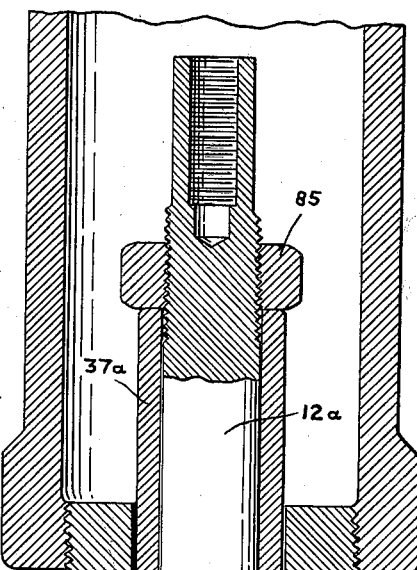
FIG. 6   FIG. 7   FIG. 8
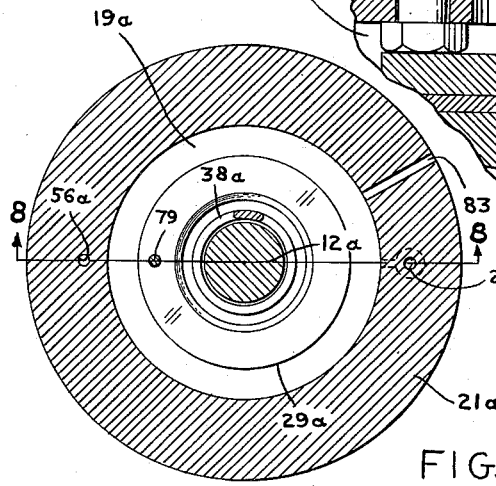
FIG. 9
JOHN W. ROBINS
INVENTOR.
BY Daniel A. Bobis
Atty

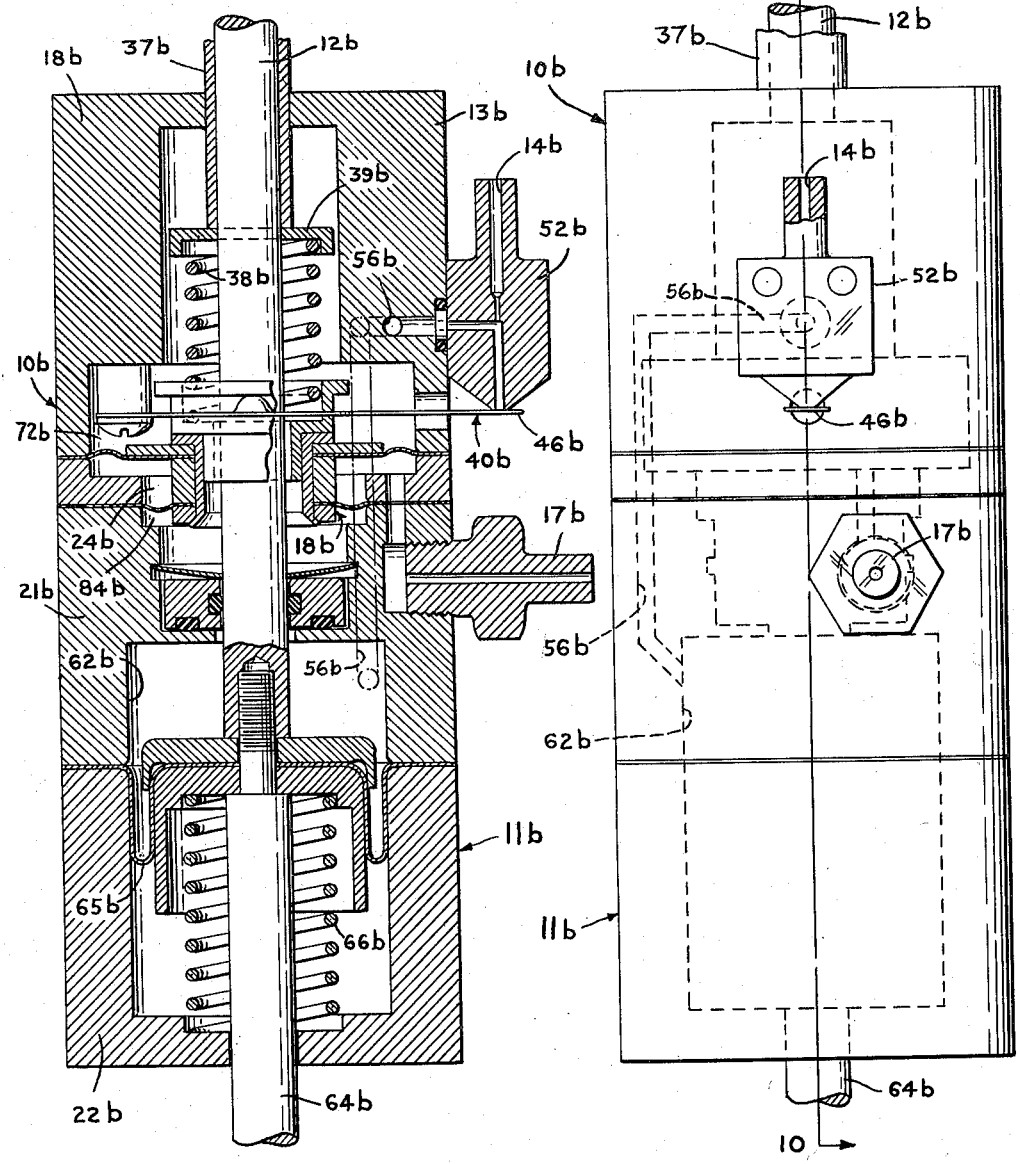

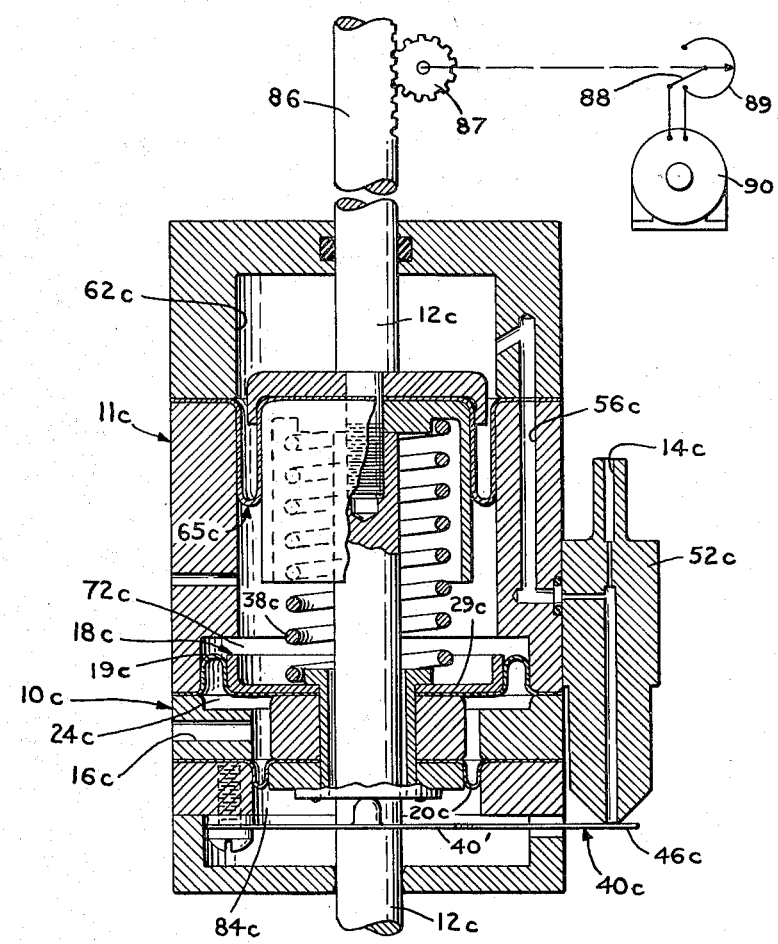
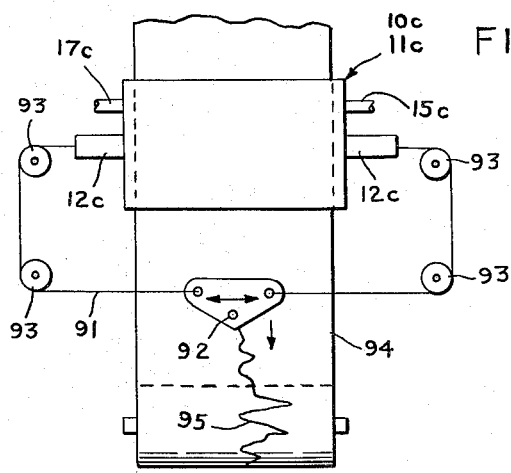

United States Patent Office

3,100,399
Patented Aug. 13, 1963

3,100,399
PNEUMATIC SERVO-POSITIONER UNIT
John W. Robins, Westwood, Mass., assignor to Worthington Corporation, Harrison, N.J., a corporation of Delaware
Filed July 21, 1961, Ser. No. 125,859
23 Claims. (Cl. 73—391)

My invention relates to improvements in pneumatic servo-positioner units for association with any one of various types of pneumatic actuators for a particular servo load which is positioned axially, and is held in repose at any given axial position thereof, in accordance with input-signal pressure applied to and sensed by the servo-positioner unit.

In the various designs proposed heretofore for servo-positioner units to which my invention relates particularly, there have been found to be some limitations and disadvantages in cases wherein the servo load is, for example, in the form of a conventional type of diaphragm-spring actuator for a single-seated control valve. In these applications precise servo action is dependent upon continuous accuracy of connecting means between the servo-positioner unit and the control-valve stem for stem feedback as the valve is moved to a new position, during which movement the feedback action takes place through such connecting means. It has been proposed to mount a servo-positioner unit on the side of a control-valve actuator, and to connect this unit to the control-valve stem by external linkage, for stem feedback. A slight amount of loss motion in such linkage can result in "creeping" of the control valve and its stem out of the desired control position therefor. Furthermore, external servo linkage is exposed and therefore is vulnerable to damage in shipment and handling.

The various pneumatic servo-positioner units of the prior art, furthermore, can be applied to a servo load for only one-way action. Each of these units is designed to effect output or valve-actuator action in only one direction; not in either direction should it be desired to obtain reversal of actuator action which, in the case of a valve-actuator, would be reversal of valve-stem direction. For example, a particular pneumatic servo-positioner unit of the prior art and designed to function, upon an increase in input-signal pressure which it senses, to cause the actuator to effect axial movement of a valve stem to a new position and in the valve-closing direction, can not by a rearrangement of the unit, or in any other way, be made to function in the opposite sense, i.e., upon an increase in input-signal pressure to cause the actuator to effect axial movement of the valve stem in the opposite or valve-opening direction. The possibility for obtaining reversal of valve-stem direction becomes more important with the increased use of single-seated control valves.

One of the objects of my invention resides in the provision of an improved pneumatic servo-positioner unit wherein no linkage is required for connection to a servo load for feedback action, and wherein the connecting means for feedback is disposed within the casing of the unit and applies the servo or feedback force directly and in a direction axially of a valve stem or other element to be positioned axially.

Another object herein resides in the provision of an improved combination of pneumatic actuator for a servo load such as a valve stem or other element to be positioned axially, and a pneumatic servo-positioner unit for controlling the actuator in accordance with signal pressure which this unit senses and responds to; such combination being characterized by the fact that by a convenient rearrangement or change in relation of the combination with respect to the servo load there can be obtained reversal of the axial-positioning direction with increase in input-signal pressure applied to the servo-positioner unit.

Other objects and advantages will hereinafter appear.

In accordance with one of the broader aspects of my invention, the novel features of design, arrangement, and coordination of the parts and components common to all of the various embodiments of my invention disclosed and claimed herein result in a servo-positioner unit provided end-to-end or longitudinally thereof with an opening in which an element to be positioned axially can be disposed for axial movement in either direction under pressure applied to an actuator diaphragm fixed with respect to the element; the unit comprising pressure-responsive means functional to sense and to respond to input-signal pressure applied to the unit, and a servo spring disposed on the element and engaged with respect to the same and to the pressure-responsive means and by such engagement being held for compression to an extent always a function of the axial position of the element, the servo spring being functional jointly with the pressure-responsive means to derive, from a constant positioner-supply pressure applied to the unit, derivative values of such pressure for application to a pneumatic actuator for the correct axial positioning of the element as called for by the signal pressure, the servo spring also being functional jointly with the pressure-responsive means to give to the unit its servo performance characteristic, thus to hold the element in repose at the correct axial position as called for by the signal pressure.

Further in accordance with a broad aspect of my invention the servo load or element to be positioned is disposed in and extends through an opening end-to-end of the servo-positioner unit and substantially coaxially of such opening, thus to obtain the possibility for reversal of direction, i.e., with the unit in one relation with respect to the element an increase in input-signal pressure results in axial positioning movement in one direction, but with the unit inverted or oriented one hundred eighty degrees from such relation an increase in input-signal pressure results in axial positioning movement in the opposite direction.

Still further in accordance with a broad aspect of my invention, the design, arrangement, and coordination of the respective parts of each of several embodiments as disclosed and claimed herein result in a universal unit which, per se, is functional in every respect as a pneumatic servo-positioner readily applicable or attachable to a conventional type of pneumatic control-valve actuator or other pneumatic actuator unit, the only requirements for the attachment to or combination with a particular actuator unit for a certain purpose being merely dimensional and relating only to correct size or capacity of the servo-positioner unit for the particular servo load involved, and necessary but always simple design of the casing of the servo unit so that it can be easily fitted to the particular actuator unit and fixed with respect to the latter, thus to complete the assembly or combination of actuator unit and the servo-positioner unit disclosed and claimed herein.

For the purpose of disclosing my invention several embodiments thereof are shown in the drawings, wherein FIG. 1 is a view, partly in elevation and partly in longitudinal section, of a combination comprising a conventional form or type of diaphragm-spring valve-actuator and a pneumatic servo-positioner unit embodying my invention as claimed herein;

FIG. 2 is a view similar to FIG. 1, showing the combination of actuator and servo units in FIG. 1 inverted to obtain stem direction the reverse of that in FIG. 1;

FIG. 3 is a detail view, on an enlarged scale and partly in elevation and partly in longitudinal section, of one form of servo-positioner unit embodying the present invention, the section being taken on line 3—3 in FIG. 4 and a portion of the valve-stem extension in FIG. 1 also being shown;

FIG. 4 is a sectional view taken on line 4—4 in FIG. 3;

FIG. 5 is an exploded view showing the respective parts of a differential-pressure component forming part of the servo unit in FIGS. 1, 2, 3 and 4, and a related stem seal;

FIGS. 6 and 7 are views, similar and corresponding respectively to FIGS. 1 and 2, showing another embodiment of my invention;

FIG. 8 is a detail view, on an enlarged scale and partly in elevation and partly in longitudinal section, of another form of servo-positioner unit embodying the present invention, the section being taken on line 8—8 in FIG. 9 and a portion of the valve-stem extension in FIG. 6 also being shown;

FIG. 9 is a sectional view taken on line 9—9 in FIG 8;

FIG. 10 is a detail view, partly in elevation and partly in longitudinal section, of an actuator and servo-positioner combination embodying my invention and wherein the output or servo load is relatively light as compared with that in FIGS. 1 to 9, the section being taken on line 10—10 in FIG. 11;

FIG. 11 is an elevational view, looking toward the left in FIG. 10;

FIG. 12 is a view comparable to and showing a simplification of the construction and arrangement in FIG. 10; and FIG. 13 is a simplified, diagrammatic view showing one way of applying either of the actuator and servo-positioner combinations in FIGS. 10 and 12 to position the pen or other marker of a common type of or arrangement for a receiver recorder.

In FIG. 3 a pneumatic servo-positioner unit embodying my invention and designated by the reference numeral 10, is shown attached to a servo load in the form of a conventional type of diaphragm-spring actuator or unit 11 for a single-seated control valve 55. A complete system embodying the combination of units 10 and 11 as in FIG. 3, is shown in full in FIG. 1.

As shown in FIG. 3, the servo-positioner unit 10 is provided end-to-end thereof with an opening in which there is disposed an element 12 for movement in either direction along its axis which is coaxial with respect to the opening through the unit.

The casing 13 of unit 10 is provided with an inlet opening 14 and associated hose connection 15 for application to the unit of positioner-supply pressure which is regulated and, for example, can be considered to be constant at twenty pounds per square inch. Casing 13 is also provided with an inlet opening 16 and associated connection 17 for application to unit 10 of input-signal pressure which, for example, can be considered to vary in value over a range from three to fifteen pounds per square inch.

Fixed within casing 13, perpendicular to the longitudinal axis of unit 10 and disposed concentrically with respect to this axis, is a differential-pressure component 18 comprising two flexible, reinforced, rubber diaphragms 19 and 20 each having its outer circular edge portion clamped securely between the parts or sections 21 and 22 of the casing 13, a spacer part or section 23 of the casing being interposed as shown, to provide the chamber 24 between the diaphragms. Chamber 24 communicates, by way of a passage 25, with inlet opening 16 and therefore is always under the input-signal pressure at opening 16.

The diaphragms 19 and 20 are provided centrally thereof with the respective openings 26 and 27 of the same diameter, for receiving with a close fit a hollow rivet 28. In assembly, protective washers 29 and 30 and a collar 31, through each of which the body of rivet 28 can pass with a relatively close fit, are placed on the rivet, the arrangement or disposition being such that after the riveting step the respective inner circular edge portions of the two diaphragms are clamped securely between collar 31 and the respective washers 29 and 30. Collar 31 serves as a spacer, the gauge or thickness thereof being the same as that of the casing section 23. In the riveting step, the flat surface 32 of the rivet head 33 is retained.

Disposed to coact with rivet 28 is a cup-shaped part 34 having a lower portion 34a and an upper portion 34b of substantially larger diameter whereby the portions 34a and 34b form a flat surface or shoulder as at 34c so that the part 34a can fit into the rivet 28 until the flat surface 34c is in engagement with the flat surface 32 of the rivet 28.

The inner diameter of the part 34 permits it to be mounted about the element or rod 12 so it can move freely relative thereto, and a radially extending annular flange on the upper end of part 34b will in this assembled position coact with a nozzle-baffle arrangement to be described.

Fitted over the top end portion of rod 12, with a sliding fit, and of sufficient length to extend downwardly along the rod and through stud 36 with a sliding fit, is a sleeve 37. The sleeve 37 is backed up and adjustable axially with respect to rod 12 by a nut 12″ threaded on the end of the rod, such adjustment being for the purpose of calibration, as will be hereinafter explained.

Disposed about rod 12 is a coil spring 38 held in compression between a washer 39 at the top of this spring and part 34 in which the bottom end of the spring is seated. Washer 39 has a sliding fit with respect to rod 12, and is engaged by the bottom end of sleeve 37, as shown.

Functional jointly with the differential-pressure component 18 in the manner and for the purpose hereinafter explained is a nozzle-baffle type of pilot valve designated generally by the reference numeral 40, such valve means 40 being disposed between inlet opening 14 and a tapped outlet opening 41 in the bottom end of casing 13.

The valve part of the valve means 40 is designated by the reference character 40′. It might be die-stamped from thin, hardened, beryllium copper, and is initially bent upward for the purpose hereinafter explained. As more clearly shown in FIG. 5, the central or body portion 42 of valve part 40′ is ring-shape to provide a centrally disposed opening 43. Extending radially outwardly from the outer edge of body portion 42 and diametrically disposed with respect to each other, are an ear 44 with aperture 45, and a baffle 46. On a diameter at 90° to that on which the ear 44 and baffle 46 are disposed and diametrically opposite to each other, are the two, small, identical tits 47 and 48 which might be stamped out to protrude upwardly from the top surface of body portion 42, and each having a semi-spherical bearing surface. The flat valve part 40′ is disposed in a plane substantially perpendicular to the longitudinal axis of unit 10, and by means of a screw 49 through aperture 45 is fixed to a post 50 disposed to one side of this axis. As shown more clearly in FIG. 4, the diameter of opening 43 is made sufficiently large to allow for ample clearance between valve part 40′ and the upper portion 34b of part 34.

The valve-seat part 40″ of the valve means 40 has a flat surface or circular edge about a vent opening 51 at the lower end of a nozzle 52, the latter being of a conventional construction and provided, integrally therewith and in the area designated by reference numeral 53, with an upstream metering orifice (not shown) whereby venturi effect is utilized to improve performance characteristics. The diameter of nozzle vent opening 51 is that of a passage 54 drilled longitudinally of nozzle 52. In determining the size or diameter of vent opening 51 account is taken of the required or available positioner-supply pressure at 14 and the full extent of stroke or movement of baffle 46 for the full range of operation of the entire assembly or combination as shown in FIG. 1, i.e., from the condition whereat control valve 55 is wide open as shown in FIG. 1, to that whereat valve 55 is closed.

The passage 54 extending centrally through nozzle 52 establishes communication between valve means 40 and inlet opening 14. The valve means 40 also communicates with outlet opening 41, by way of the nozzle passage 54 and passage 56.

A servo or feedback connection between rod 12 and the valve means 40 is made through the compressed servo spring 38 and the flange 35 and tits 47 and 48, the latter being held engaged with the under surface of flange 35 on account of valve part 40' having been initially bent upward, as aforesaid.

Disposed about rod 12 and between component 18 and outlet opening 41, is a self-aligning stem seal 57 having an O ring 58 engaging rod 12 with a sealing but sliding fit with respect thereto, and an O ring 59 pressed against the adjacent surface of casing section 22 by a spring washer 60 held pressed against the stem seal 57 by a ring 61 fixed with respect to the casing section 22.

The servo or follow-up action which takes place in unit 10 for axial positioning of element 12 in accordance with input-signal pressure at 16, is as follows.

The differential-pressure component 18 senses the input-signal pressure at inlet opening 16 and since the effective area of diaphragm 19 is substantially greater than that of diaphragm 20, as shown in FIG. 3, rivet 28 and the part 34 seated thereon, are always urged upwardly by a force represented in FIG. 3 by the arrow F', this force always being a function of input-signal pressure at 16 and always being directed upwardly and axially of rod 12.

Valve part 40' having been initially bent upward, will always hold itself engaged with the under surface of flange 35 and will, therefore, follow or move along with any upward, axial movement of part 34 and rivet 28 on which part 34 is held seated by the compressed spring 38.

The compressed servo spring 38 applies to part 34 a force represented by the arrow F in FIG. 3, this force being always directed downwardly and axially of rod 12, thus to oppose force F', and being always a function of the axial position of rod 12 and sleeve 37, which, in turn, is a function of positioner output pressure. When there is the equality of axial forces, that is F equals F' at any given value of input-signal pressure, the part 34 and baffle 46 engaged therewith are held in repose at a corresponding axial position of the same.

Any extent of increase or decrease in extent of compression of the servo spring 38 between sleeve 37 and part 34 increases or decreases the value of force F by a force represented in FIG. 3 by the double headed arrow $f$, the force F being directed axially of rod 12 and being a function of extent of change in axial position of rod 12 and sleeve 37, which position in turn is a function of extent of variation in input-signal pressure at 16.

From the foregoing it will be seen that the servo action of unit 10 is in accordance with the equation $$F \pm f = F'$$

With a given increase in input-signal pressure, part 34 is moved up to increase force F' so that there is no longer the above equality, the force F' now being predominant. At the same time, the valve part 40' always holding itself engaged with part 34, also moves up with the latter to position baffle 46 closer to its seat at 40", thus to increase nozzle-output pressure and the pressure in diaphragm chamber 62 to effect downward, axial, valve-closing movement of valve stem 63 and sleeve 37 to a new, lower, axial position of the same. During this downward movement of sleeve 37 the spring 38 is further compressed to increase the servo force $f$ until F again equals F', whereupon baffle 46 is held in repose at its new position. Under these conditions of balance now existing, valve 55 is held in repose at its new, lower, control position.

With a given decrease in input-signal pressure, part 34 is moved down to decrease force F' so that there is no longer the above equality, the force F now being predominant. At the same time, the valve part 40' is moved down by part 34 to position baffle 46 further away from its seat at 40", thus to decrease nozzle-output pressure and the pressure in diaphragm chamber 62 to effect upward, axial, valve-opening movement of valve stem 63 and sleeve 37 to a new, higher, axial position of the same. During this upward movement of sleeve 37 the extent of compression of spring 38 is decreased to decrease the servo force $f$ until F again equals F', whereupon baffle 46 is held in repose at its new position. Under these conditions of balance now existing, element 12 is held in repose at its new, higher, control position.

The servo-positioner unit 10 can be combined with any type of pneumatic actuator embodying suitable diaphragm means which, in such combination, is fixed with respect to element 12 in FIG. 3 and is disposed for movement, under pressure applied to the actuator from passage 56 of unit 10, in the direction axially of element 12. In FIG. 1 there is shown such a combination wherein the actuator is a conventional form or type of diaphragm-spring valve-actuator 11 comprising, essentially, the single-seated control valve or plug 55 shown in its fully-open position and fixed to the lower end of stem 63, the upper end of the latter being fixed, through a spring stem 64, to a diaphragm 65. In operation, valve 55 is moved toward or to its seated or closed position upon admission of compressed air to the diaphragm chamber 62, the pressure on the top surface of the diaphragm being sufficient to overcome or to dominate the upward force, against the bottom surface of the diaphragm, of a compressed valve spring 66. When the compressed-air supply to chamber 62 is either reduced to a relatively low value or is shut off and chamber 62 vented to atmosphere, the upward force of the compressed spring 66 is effective to unseat valve 55 and to move the same up, to its fully-open position shown. Element 12 is, in effect, an extension of the spring stem 64. As shown, valve stem 63, spring stem 64, and element 12 are coaxial with respect to each other and are assembled and joined or fixed with respect to each other to constitute, in effect, a single element coaxial of the longitudinal axes of units 10 and 11 and moveable axially as explained above with regard to element 12 taken by itself. An indication of the axial position of valve 55 with respect to its seat in the valve casing 67 is provided by an index 68 fixed with respect to stem 63 for axial movement therewith and with respect to a suitable scale 69 fixed to the yoke 70.

In the operation of the servo-positioner unit 10, combined with the actuator 11 as shown in FIG. 1, the differential-pressure component 18 and the valve means 40 function jointly or in coordination as pressure-responsive means 18, 40 functional to derive, from the constant positioner-supply pressure applied to the unit at inlet opening 14, derivative values of such pressure which occur in the nozzle-output passage 56 communicating with diaphragm chamber 62 via the passage or space shown between rod 12 and nut 71 screwed into the internally-threaded outlet opening 41 and functional, as shown in FIG. 3, to secure or fasten unit 10 to unit 11 with the adjacent, flat surfaces of the latter engaged flush.

A derivative value of the constant positioner-supply pressure is more commonly referred to as nozzle-output pressure, the latter being pressure on the downstream side of the orifice at 53 or, in other words, the pressure at the upper end of passage 56 where the latter joins passage 54. When the nozzle baffle 46 is pressed against its seat at 40" to close the nozzle vent opening 51, there is minimum pressure drop across the orifice at 53 and nozzle-output pressure is at the maximum value thereof, being equal to supply pressure at 14 minus the relatively low pressure drop across the orifice. Nozzle-output pressure, at this maximum value and applied to the top surface of diaphragm 65 by way of passage 56 and outlet opening 41 to the diaphragm chamber 62, is sufficient to force valve 55 down against the opposing upward force of spring 66, and to the full extent or stroke necessary to firmly seat the valve and hold the same in the closed position thereof.

Nozzle-output pressure is at the minimum value thereof when the nozzle baffle 46 has been moved down through the full extent of its stroke which, in the disclosed embodiment, can be considered to be a distance of approximately .001" from the valve seat or cross-sectional plane at vent opening 51. The nozzle baffle would then be in its fully-open position for maximum venting of air from nozzle passage 54, out through vent opening 51 into chamber 72 which is always open to and therefore always under atmospheric pressure through a suitable vent (not shown) made through the wall of casing 13 or otherwise provided for. With nozzle baffle 46 in its fully-open position there is maximum pressure drop across the orifice at 53 and nozzle-output pressure is at the minimum value thereof, being equal to supply pressure at 14 minus the relatively high pressure drop across the orifice. The downwardly-directed force at the minimum value of nozzle-output pressure then applied to chamber 62 and to the top surface of diaphragm 65, is now considerably less than the opposing upward force of the diaphragm spring 66. Under these conditions the servo load or valve 55 is moved up by the dominating force of spring 66 and to the full extent or stroke necessary to place valve 55 in the fully-open position thereof, as in FIG. 1. During this action and the corresponding upward stroke or movement of diaphragm 65, the diaphragm-head volume of air in chamber 62 is forced out to atmosphere by way of outlet opening 41, passage 56, passage 54, the open nozzle vent 51, and chamber 72.

At intermediate positions of baffle 46 the nozzle-output pressure and the pressure in diaphragm chamber 62 will be at respective and corresponding intermediate values thereof, thus to hold valve 55 and its stem 63 in respective and corresponding intermediate axial positions of the same, these intermediate positions of valve 55 and its stem 63 being indicated by an index 68.

In setting up and calibrating the combination as shown in FIGS. 1 and 3 to establish the correct operating action thereof, the pressure at 14 is set and kept at twenty pounds, and the pressure at 16 is set and kept at the intermediate value of nine pounds, for valve 55 to be at the half-open position thereof. Under these two pressure conditions the nozzle baffle 46 will be in one of its intermediate positions to establish nozzle-output pressure at a corresponding value, thus to raise or lower the pressure in diaphragm chamber 62 to this same nozzle-output pressure at which valve 55 will be positioned axially, to correspond. If the degree or extent of compression of the servo or feedback spring 38 now is what it should be, the index 68 will be at the center of scale 69, or in other words, valve 55 will be in its half-open position. Should index 68 be to one side or the other of the center of scale 69, sleeve 37 is adjusted axially one way or the other with nut 12" to vary the extent of compression of spring 38, thus to effect corresponding movement of baffle 46 and variation in nozzle-output pressure to reposition valve 55. Such adjustment of sleeve is made until index 68 is at the center of scale 69.

In the control system shown in FIG. 1, input-signal pressure at 16 is a function of pressure differential across a venturi tube 73, the connection 17 being made to a suitable type of controller C functional to convert variations in the differential pressure linearly to variations in signal pressure applied to unit 10 through connection 17 from the controller C.

Reversal of valve-stem direction, as such direction is in FIGS. 1 and 3, can be obtained by first removing, in FIG. 1, cap 74 and a nut 75 holding yoke 70 and the valve-spring housing 76 fixed with respect to each other, then inverting the combination of units 10 and 11 in relation to the yoke, as shown in FIG. 2. The stud 36 is now at the bottom and passes downwardly through the top end 77 of yoke 70 which is now adjacent to and engaged with unit 10, being secured to the latter by the nut 75 now threaded and tightened up on stud 36. Also, stem 64 now extends upwardly from diaphragm 65 and out through the spring housing 76. A cap 78, similar to cap 74 in FIG. 1 is screwed onto a threaded stud (not shown) now extending upwardly from the housing 76, onto which stud nut 75 had in FIG. 1 been threaded and tightened up on to hold unit 11 and yoke 70 fixed with respect to each other as shown in FIG. 1, i.e., with the bottom flat surfaces of the housing engaged flush with the top flat surface of the yoke.

In FIG. 2 the valve-actuating and servo operations are the same as those in FIGS. 1, 3 and 4, but with the combination of units 10 and 11 now inverted as in FIG. 2 an increase in value of input-signal pressure at 17 will result in upward axial movement of valve stem 63, as indicated by the arrow in FIG. 2, thus to move valve 55 to a new position but in the valve-opening direction rather than in the valve-closing direction as in FIG. 1.

With regard to the embodiment disclosed in FIGS. 1 and 3 and wherein the area of diaphragm 65 can be considered to be in the range from about fourteen to about twenty-five square inches, it has been determined that the use of valve means 40 of the nozzle-baffle type disclosed, has limitations. These reside in the fact that in the use of valve-actuators of the larger sizes and wherein respective areas of the power or valve-actuating diaphragms are in a range substantially greater than fourteen to twenty-five square inches, diaphragm-chamber volumes are then so much larger that stroking speed is too slow with a nozzle-baffle type of pilot valve as in FIG. 3. For the larger valve-actuators, therefore, it is proposed to use for the servo-positioner unit a design such as that shown in FIGS. 6 to 9, wherein the parts, components or units corresponding respectively to the same in FIGS. 1 to 5 have been designated by the same respective reference numerals, with the suffix "a."

In the embodiment shown in FIGS. 8 and 9 the reference numeral 11a designates a diaphragm-spring valve-actuator similar to that in FIG. 1 but wherein the volume of diaphragm chamber 62a is considerably larger than the volume of diaphragm chamber 62 in FIG. 1. The construction and arrangement of parts and the manner of operation of the actuator or unit 11a in FIG. 8 are the same as described above with regard to the smaller unit 11 in FIG. 3.

The casing 13a of the pneumatic servo-positioner unit 10a in FIG. 8 is provided with a first inlet opening 14a and associated hose connection 15a for admission into this unit of positioner-supply pressure, the latter being regulated to be substantially constant at all times, as in FIG. 3. Casing 13a is also provided with a second inlet opening 16a and associated connection 17a for application to unit 10a of input-signal pressure as, for example, in FIG. 3.

The reference character 40a designates 3-way valve means connected, for the supply thereto of positioner-supply pressure, to inlet opening 14a by a passage 54a. The valve means 40a comprises a vertically disposed stem 79 provided at its upper end with a single-seated pilot valve 46a and substantially centrally thereof with a single-seated vent valve 80, the stem portion 81 between these valves having a relatively loose fit in a valve-seat part 40a" thus to permit free flow of compressed air downwardly around the stem portion 81 and thence to the passage 56a. As shown in FIG. 8, the pilot valve 46a seats or closes with supply pressure at 14a and the vent valve 80 opens with the pressure on the downstream side of valve 46a. The valve-seat part 80 is held in the position shown by a nut 82 through which the valve stem 79 passes with a relatively loose fit, thus to permit air flow downwardly around stem 79 and into chamber 72a, and thence out to atmosphere by way of a vent opening 83. The lower end portion of stem 79 where the latter passes downwardly through and beyond the bottom opening in nut 82 may have an irregular cross-sectional configuration sufficient to provide adequate rate of venting into chamber 72a by way of the bottom opening in nut 82.

By virtue of the arrangement shown wherein the pilot valve 46a seats or closes with the supply pressure at 14a, this valve is always biased or urged toward its closed position, thus to hold the tip of stem 79 always engaged with the flat surface of a washer 29a constituting part of a differential-pressure component 18a comparable in structure, function and purpose to the component 18 in FIGS. 3 and 4.

Component 18a comprises diaphragms 19a and 20a of different effective areas and having their outer edge portions securely clamped between the casing sections 21a and 22a, an interposed section 23a serving as a spacer to provide between the complementary diaphragms a chamber 24a. Around their inner edge portions the diaphragms 19a and 20a are clamped between the rivet edges and a collar 31a as in FIG. 3. A passage 25a connects chamber 24a with inlet opening 16a. The air pressure in chamber 24a, therefore, is always the same as and varies with occurring variations in the input pressure signal at 16a. The chamber 84a below diaphragm 20a is connected with chamber 72a by a suitable passage (not shown). Both of the chambers 72a and 84a are, therefore, always under atmospheric pressure.

As in FIG. 3, the element 12a to be positioned axially extends upwardly through the servo-positioner unit 10a. A servo spring 38a disposed on element 12a is held compressed between rivet 28a and the lower end of a sleeve 37a having a sliding fit on the rod. For the purpose of calibration, as in FIG. 3, a nut 85 is threaded on the top end of rod 12a to engage the top end of sleeve 37a and hold spring 38a compressed.

The lower end of stem 79 being vertically disposed and always engaged directly with the flat surface of washer 29a, and this surface being disposed, as shown, in a plane perpendicular to the longitudinal axis of servo unit 10a, it will be seen that the pilot valve 46a and its stem 79 will move axially of unit 10a, in the same direction and to the same extent as component 18a.

The manner of operation in FIGS. 6 and 8 is substantially the same as that in FIG. 3. Upon an increase in input-signal pressure at 16a, component 18a will move up to cause upward movement of rivet 28a and washer 29a, and upward axial movement of valves 46a and 80 to an extent which is a function of the extent of increase in the signal pressure at 16a, thus to effect a corresponding increase in the output pressure from valve means 40a, which output pressure is in passage 56a and can be compared with the "nozzle-output pressure" in passage 56 in FIG. 3. The pressure in passage 56a will now be increased accordingly, and element 12a and sleeve 37a will be moved down until the servo spring 38a is further compressed to increase the value of the servo force to the point whereat there is a balance as in FIG. 3.

Upon a decrease in input-signal pressure at 16a, to cause downward movement of rivet 28a and component 18a, valves 46a and 80 will move down axially to an extent which is a function of the extent of decrease in the output pressure from valve means 40a. The pressure in passage 56a will now be decreased accordingly and element 12a and sleeve 37a will be moved up until the compression of servo spring 38a is decreased to decrease the value of the servo force to the point whereat there is a balance as in FIG. 3.

In the same manner described with regard to unit 10, the servo-positioner unit 10a can be combined with any type of pneumatic actuator. In FIG. 1 there is shown such a combination wherein the actuator is a conventional form or type of diaphragm-spring valve-actuator 11a, the same as actuator 11 in FIG. 1.

By removing nut 75a in FIG. 6, the combination of actuator unit 11a and servo unit 10a can be detached from the valve yoke 70a and inverted in relation to the yoke, as shown in FIG. 7, for reversal of valve-stem direction. In FIG. 7, nut 75a is screwed onto the stud 36a as in FIG. 2. The operating action will then be the opposite or reverse of that in FIG. 6, i.e., upon an increase in input-signal pressure at 16a the valve stem 63a and associated control valve 55a will move up, as indicated by the arrow in FIG. 7.

With regard to any pneumatic servo-positioner embodying the broad aspects of my invention as disclosed and claimed herein, there is seen to be good usage for the same in applications and under conditions wherein the servo load or element to be positioned is relatively light as compared to the more or less heavy-duty performance required of a pneumatic actuator and positioner combination for a single-seated control valve such as valve 55 in FIG. 1. In FIGS. 10 and 11 there is shown a simplified design embodying my invention and applicable for the purpose of positioning a relatively light servo load such as one or more pens or marking elements forming part of a conventional type of receiver recorder.

In FIGS. 10 and 11 the parts, components or units corresponding respectively to the same in FIGS. 1 and 3 have been designated by the same respective reference numerals, with the suffix "b."

In FIG. 10 the reference character 40b designates valve means in the form of a nozzle-baffle type of air pilot responsive to any occurring variation in inlet-pressure signal at connection 17b. The associated nozzle 52b is disposed outside of and fixed to the casing 13b. The nozzle baffle 46b extends to the outside through the opening shown in the casing. Regulated supply pressure is at inlet opening 14b. The chamber 24b of a differential-pressure component 18b is always under the signal pressure at 17b.

The spring stem 64b and associated element 12b to be positioned, extend through the combination of actuator unit 11b and servo unit 10b for movement axially or longitudinally thereof.

Nozzle-outlet pressure is supplied by way of passage 56b, to chamber 62b. Fixed with respect to the stem 64b is a molded rubber diaphragm or so-called Bellofram 65b, the outer edge portion of which is clamped securely between the casing sections 21b and 22b. A coil spring 66b disposed on stem 64b is compressed between Bellofram 65b and the bottom end of casing section 22b.

A servo or feedback spring 38b is held compressed between a washer 39b engaged by a sleeve 37b disposed on and having a sliding fit with respect to rod 12b.

The important difference between the design of the positioner unit is FIGS. 1 and 3 and that shown in FIG. 10 resides in use of the molded rubber diaphragm or Bellofram 65b, the elasticity of which is opposed by compression spring 66b. There is the following relation. In the combination as in FIGS. 1 and 3 and comprising the positioner unit 10 and the valve-actuator unit 11, the spring rate of valve spring 66 is many times greater than that of the feedback spring 38. As a consequence, the force exerted by the feedback spring on the valve stem 63 is negligible. However, in the servo-positioner unit 10b shown in FIGS. 10 and 11 this is not the case since the spring rate of feedback spring 38b and the intrinsic elasticity of Bellofram 65b are of the same order of magnitude, and so much so that for some applications spring 66b can be eliminated because the Bellofram, by proper design, could be made adequate so that the Bellofram would serve the purpose by itself. In FIG. 10 the Bellofram can be considered to have a range of movement sufficient to provide for total movement or stroke of stem 64b and element 12b through about five-eighths of an inch.

The operation in FIGS. 10 and 11 is essentially the same as that in FIGS. 1 and 3. Increase in signal at 17b causes upward movement of baffle 46b to increase nozzle-output pressure in passage 56b to chamber 62b. Under the higher pressure Bellofram 65b moves stem 64b and element 12b down. Such downward movement is the same for rod 12b and sleeve 37b, thus to compress further the feedback spring 38b to equalize the opposing forces which in FIG. 10 are of the same direction and nature as the forces in FIG. 3. Upon a decrease in signal pressure at 17b the reverse action takes place, the same as in FIGS. 1 and 3.

In the embodiment shown in FIG. 12 the parts, components or units corresponding respectively to the same in FIGS. 1 and 3 have been designated by the same respective reference numerals, with the suffix "c."

In FIG. 12 considerable simplification of design is made possible by elimination of the spring 66b of FIG. 10 and the use of the molded rubber diaphragm or Bellofram 65c which coacts with a servo spring 38c held compressed between the molded rubber diaphragm 65c and the top plate of washer 29c of a differential-pressure unit 18c.

The element 12c to be positioned axially extends through the combination of actuator 11c and servo positioner 10c and is fixed centrally of the molded rubber diaphragm 65c.

The nozzle baffle 46c and the associated nozzle 52c are disposed at one end of the combination, and the molded rubber diaphragm chamber 62c is disposed at the other end of the latter. Furthermore, the differential-pressure component 18c is disposed between the valve part 40c' and Bellofram 65c, thus to make possible disposition of the servo spring 38c centrally of the entire assembly and between the molded rubber diaphragm and component 18c for direct engagement with the latter, as shown.

Positioner-supply pressure is applied at 14c to nozzle 52c and nozzle-output pressure is applied to chamber 62c by way of passage 56c.

Input-signal pressure is applied at 16c and thence to chamber 24c between the diaphragms 19c and 20c of component 18c. Chambers 72c and 84c are always under atmospheric pressure.

As in FIG. 3, the nozzle baffle 46c is spring-biased closed.

In operation, upon an increase in signal pressure at 16c, component 18c will move up to permit baffle 46c to move further toward its closed position, thus to increase nozzle-output pressure applied to chamber 62c. Under this higher pressure in chamber 62c the Bellofram and element 12c will move down to a new position, and during such movement servo spring 38c will be further compressed to the extent whereat the greater downward force then applied to component 18c will hold baffle 46c in repose at its new position whereat the value of nozzle-output pressure remains constant to hold element 12c in repose at its new position.

With a decrease in signal pressure at 16c, component 18c will move down to move baffle 46c further away from nozzle 52c, thus to decrease nozzle-output pressure applied to chamber 62c. Under this lower pressure in chamber 62c the Bellofram and element 12c will move up to a new position, and during such movement the extent of compression of servo spring 38c will decrease to the extent or point whereat the lesser downward force then applied to component 18c will hold baffle 46c in repose at its new position whereat the value of nozzle-output pressure remains constant at the then lower value to hold element 12c in repose at its new position.

An extension 86 of element 12c may be provided with teeth to mesh with a pinion 87 connected, as indicated by the broken line, to the movable contact arm 88 of a potentiometer 89 connected, for example, for speed-control of an electric motor 90. By this arrangement, the positioning of element 12c can be made to vary the effective electrical resistance of potentiometer 89 as a function of input-signal pressure at 16c.

In FIG. 13 there is shown an actuator and servo positioner combination as in FIGS. 10 and 12, applied for use to position pneumatically a pen or other marker of a common type of receiver recorder. In this pneumatic system, a steel wire 91, having a pen or other marker 92 fixed thereto and extending around pulleys 93, as shown, has its ends fixed to the respective ends of element 12c of an assembly as shown in FIG. 12. A chart 94 is moved at a relatively slow, constant rate in the direction indicated by the arrow. As the pen or marker 92 is moved to the right or left or is held in one position by element 12c, a performance or other graph 95 is recorded.

An advantage in the construction, arrangement, and pivotal support at 50 for valve part 40' in FIGS. 3, 4 and 5, resides in multiplication at baffle 46 of the extent of axial movement of part 34 for a given variation in input-signal pressure at 16. For example, with baffle 46 a distance from post 50 at least twice the distance from post 50 to the point of application of force F', for any given extent of axial movement of part 34, the baffle 46 will be moved axially through at least twice the extent of axial movement of part 34. Thus, the baffle 46 is made to be extremely sensitive and responsive to the slightest axial movement of part 34. This same advantage is to be found in the embodiments shown in FIGS. 10 and 12.

With reference again to one of the broader aspects of my invention, it will be seen that this resides, as for example in FIGS. 3 and 4, in the provision of servo-positioner means 10 for association with a servo load in the form of an element 12 movable in either direction along an axis of the latter coaxial with respect to the longitudinal axis of the means or unit 10 which is provided end-to-end thereof with an opening for receiving the element 12 for axial movement of the latter, the unit 10 embodying pressure-responsive means comprised of component 18 and valve means 40 and functional to derive from the constant positioner-supply pressure at 14 derivative values of such pressure in passage 56 to the diaphragm chamber 62, such derivative values of the constant positioner-supply pressure extending over a range adequate for imparting to element 12 axial movement to any given axial position thereof, and the unit 10 embodying spring means 38 engaged with and functional jointly with the pressure-responsive means 18, 40 to give to the servo-positioner means 10 its servo-positioning characteristic with respect to element 12, thus to hold the latter in repose at any given axial position of the same. This same broad concept of invention is also to be found in the embodiments disclosed in FIGS. 8, 9, 10, 11, 12 and 13.

It will be understood that various embodiments of my invention other than those disclosed, are possible without departing from the spirit of my invention or the scope of the claims.

What is claimed is:

1. In pneumatic servo-positioner means for association with a servo load in the form of an element movable in either direction along an axis coincident with the longitudinal axis of said means; a casing provided with a first inlet opening for application to said means of a substantially constant positioner-supply pressure, said casing being provided with a second inlet opening for application to said means of input-signal pressure, differential-pressure means having communication with said second inlet opening and functional to sense and to respond to variations in said input-signal pressure, said differential-pressure means being disposed subtantially concentrically with repect to said longitudinal axis and about said movable element, valve means communicating with said first inlet opening and in operative engagement with said differential-pressure means to establish in said servo-positioner means the exact derivative value of positioner-supply pressure required to effect axial movement of said element to a given position and to hold said element in repose at said given position, and resilient means disposed within said casing and concentrically with respect to said longitudinal axis, one end of said resilient means in engagement with said differential-pressure means, the other end of said resilient means connected to and actuated by said movable element for axial movement identical in extent to any axial movement of said element to effect continuous transmission through said resilient means of a force directly to said differential-pressure means in an extent and value effective for the functioning of said servo-positioner means to hold said element in repose at said given axial position.

2. In pneumatic servo-positioner means as defined by claim 1 wherein said differential-pressure means embodies a pair of diaphragms supported in spaced relation with respect to each other to provide between the same a chamber communicating with said second inlet opening.

3. In pneumatic servo-positioner means as defined by claim 2 wherein each of said diaphragms centrally thereof is provided with an opening, and wherein said differential-pressure means embodies a hollow rivet extending through said openings and a collar disposed about said rivet and between the respective inner edge portions of said openings, said edge portions being clamped between and fixed with respect to each other by the rivet structure and said collar.

4. The pneumatic servo-positioner means or combination as defined by claim 1 wherein said valve means embodies a ring-shape body portion provided on a surface thereof with two bearing surfaces diametrically disposed with respect to each other and each engaged with said differential-pressure means.

5. In a servo unit as claimed in claim 1 having a first connecting means at one end, a second connecting means substantially identical to said first connecting means at the end remote from said first connecting means, said first connecting means and said second connecting means disposed in the axial line of said servo unit and to permit said unit to be interchangeably mounted for reversal of element positioning-direction.

6. In a servo unit as claimed in claim 1 having at the opposite ends thereof substantially identical connecting means, said connecting means being complementary with respect to each other to permit inversion of said servo unit with respect to its servo load.

7. In combination, pneumatic servo-positioner means and a servo load to be positioned thereby and in the form of an element movable in either direction along an axis of the latter to any given axial position within the range of axial movement of said element; said servo-positioner means comprising a casing provided with a first inlet opening for application to said means of a substantially constant positioner-supply pressure, said casing being provided with a second inlet opening for application to said means of input-signal pressure, differential-pressure means having communication with said second inlet opening and functional to sense and to respond to variations in said input-signal pressure, said differential-pressure means be-functional to sense and to respond to variations in said input-signal pressure, said differential-pressure means being disposed substantially concentrically with respect to the longitudinal axis of said servo-positioner means, said element extending through said servo-positioner means end-to-end thereof and being disposed with its said axis coaxial with respect to the longitudinal axis of said servo-positioner means, means embodying a diaphragm fixed with respect to said element and functional upon application to said diaphragm of derivative values of said positioner-supply pressure to impart to said element axial movement of the same to the respective axial positions thereof, passage means in said servo-positioner means connected to said diaphragm means to pass said derivative values of positioner supply pressure to said diaphragm means for actuation thereof, valve means communicating with said first inlet opening and engaged with said differential-pressure means for actuation by the latter and functional upon such actuation to derive from said positioner-supply pressure and to establish in said servo-positioner means for application to said diaphragm means the exact derivative value of positioner-supply pressure required for said diaphragm means to impart to said element axial movement of the same to said given axial position and for said diaphragm means to hold said element in repose thereat, and a coil spring disposed within said casing and concentrically with respect to said axes, one end of said spring being engaged with said differential-pressure means, the other end of said spring for compression of the same being engaged with respect to said element for axial movement identical in direction and extent to any axial movement of said element thus to effect continuous transmission through said spring of a force applied directly to said differential-pressure means and to the extent and value effective for the functioning of said servo-positioner means to hold said element in repose at said given axial position of the same.

8. In a servo unit as claimed in claim 7 having means at either end to permit said unit to be mounted for use by connection to either end interchangeably.

9. In a servo unit as claimed in claim 7 having a first connecting means at one end, a second connecting means substantially identical to said first connecting means at the end remote from said first connecting means, said first connecting means and said second connecting means disposed in the axial line of said servo unit and to permit said unit to be interchangeably mounted for reversal of element positioning-direction.

10. In a servo unit as claimed in claim 7 having at the opposite ends thereof substantially identical connecting means, said connecting means being complementary with respect to each other to permit inversion of said servo unit with respect to its servo load.

11. The combination as defined by claim 7 wherein said differential-pressure means includes a pair of diaphragms supported in spaced relation with respect to each other to provide between the same a chamber communicating with said second inlet opening.

12. The combination as defined by claim 7 wherein said differential-pressure means embodies, a pair of diaphragms supported in spaced relation with respect to each other to form a chamber therebetween communicating with said second inlet opening, and said diaphragms centrally thereof are each provided with an opening, a hollow rivet extending through said openings and a collar disposed about said rivet and between the respective inner edge portions of said openings, said edge portions being clamped between and fixed with respect to each other by the rivet structure and said collar, said element extending through said rivet.

13. The combination as defined by claim 7 wherein said valve means is a nozzle-baffle type of pilot-valve means.

14. The combination as defined by claim 7 wherein said valve means embodies a valve part fixed at only one end thereof with respect to said casing and to one side of said element, the free portion of said valve part being disposed in a plane substantially perpendicular to said axis of said element and extending to the other side of the latter, said valve part at the free end thereof being provided with a baffle, said valve means being engaged with said differential-pressure means at a point intermediate said ends of said valve part.

15. The combination as defined by claim 14 wherein the central portion of said valve part is ring-shape and is disposed about said element in spaced relation with respect to the latter.

16. In a pneumatically-powered recorder system; a marker supported and disposed for movement in either of two substantially opposite directions, means for having recorded thereon by said marker a graph and supported and disposed for movement in a direction angular with respect to the direction of said movement of said marker, and a pneumatic actuator and servo-positioner unit for imparting said movement to said marker and provided end-to-end thereof with an opening; said unit comprising an element disposed in said opening for movement in either direction along its axis to any given axial position and so disposed with its said axis substantially coaxial with respect to said opening, a diaphragm fixed with respect to said element, differential-pressure means responsive to input-signal pressure applied to said unit, valve means engaged with respect to and controlled by said differential-pressure means and as so controlled functional to derive from substantially constant positioner-supply pressure applied to said unit derivative values of such pressure, said unit being provided with a passage for the application to said diaphragm of said derivative values of said positioner-supply pressure, and a coil spring disposed about said element between said diaphragm and said differential-pressure means; and means connecting said element and said marker for said movement of the latter in a direction and to an extent corresponding to the direction and extent of movement of said element, said spring being compressed between said diaphragm and said differential-pressure means and functional in accordance with the extent of its compression to give to said unit a servo-positioning characteristic with respect to said element thus to hold the latter and said marker in repose at their respective given positions for the particular derivative value of positioner-supply pressure being supplied to said diaphragm.

17. A pneumatic actuator and servo-positioning unit provided end to end thereof with an opening comprising, an element in said opening with its axis coincident with the axis of said opening and disposed for axial movement to any given position, a diaphragm motor fixedly connected for movement with said element, means for delivering an input signal pressure to said unit, differential pressure means having communication with said input signal means and functional to sense and to respond to variations in said input signal pressure, said differential pressure means disposed substantially concentric with respect to said longtiudinal axis and about said movable element, means supplying substantially constant positioner supply pressure to said unit, valve means communicating with said positioner supply pressure means and in operative engagement with and controlled by said differential pressure means and as so controlled functional to derive derivative values of positioner supply pressure, said unit being provided with a passage for application to said diaphragm motor of said derivative values of the positioner supply pressure, and resilient means disposed within said unit concentric with respect to said longitudinal axis, one end of said resilient means in engagement with said differential pressure means and the other end of said resilient means connected to and actuated by said movable element for movement identical in extent to any axial movement of said element to effect continuous transmission through said resilient means of a force directly to said differential pressure means in an extent and value effective for the functioning of said servo-positioner means to hold said element in repose at the axial position thereof for the particular derivative value of positioner supply pressure being applied to said diaphragm.

18. A pneumatic actuator and servo-positioner unit as defined by claim 17 wherein said differential-pressure means includes a pair of diaphragms supported in spaced relation with respect to each other to provide between the same a chamber to which the input-signal pressure is applied.

19. A pneumatic actuator and servo-positioner unit as defined by claim 18 wherein each of said diaphragms centrally thereof is provided with an opening, wherein said differential-pressure means embodies a hollow rivet extending through said openings and a collar disposed about said rivet and between the respective inner edge portions of said openings, said edge portions being clamped between and fixed with respect to each other by the rivet structure and said collar, said element extending through said rivet.

20. In a servo unit as claimed in claim 17 having a first connecting means at one end, a second connecting means substantially identical to said first connecting means at the end remote from said first connecting means, said first connecting means and said second connecting means disposed in the axial line of said servo unit and to permit said unit to be interchangeably mounted for reversal of element positioning-direction.

21. In a servo unit as claimed in claim 17 having at the opposite ends thereof substantially identical connecting means, said connecting means being complementary with respect to each other to permit inversion of said servo unit with respect to its servo load.

22. A pneumatic actuator and servo-positioner unit as defined by claim 17 wherein said valve means is a nozzle-baffle type of pilot-valve means.

23. A pneumatic actuator and servo-positioner unit as defined by claim 17 wherein said valve means embodies valve structure comprising a valve stem engaged at one end thereof with said differential-pressure means and supported for axial movement, a pilot valve at the other end of said stem and disposed for closing with the positioner-supply pressure, and a vent disposed intermediate the ends of said stem for closing against the positioner-supply pressure.

References Cited in the file of this patent
UNITED STATES PATENTS

| | | |
|---|---|---|
| 2,411,748 | Kelly | Nov. 26, 1946 |
| 2,558,506 | Annin | June 26, 1951 |
| 2,643,667 | Dahl | June 30, 1953 |
| 2,753,692 | Dickieson | July 10, 1956 |
| 2,934,305 | Farris et al. | Apr. 26, 1960 |
| 2,977,051 | Farkas et al. | Mar. 28, 1961 |